(No Model.) 3 Sheets—Sheet 2.
F. C. CHADBORN.
VENTILATOR FOR GREENHOUSES OR OTHER STRUCTURES.
No. 551,889. Patented Dec. 24, 1895.
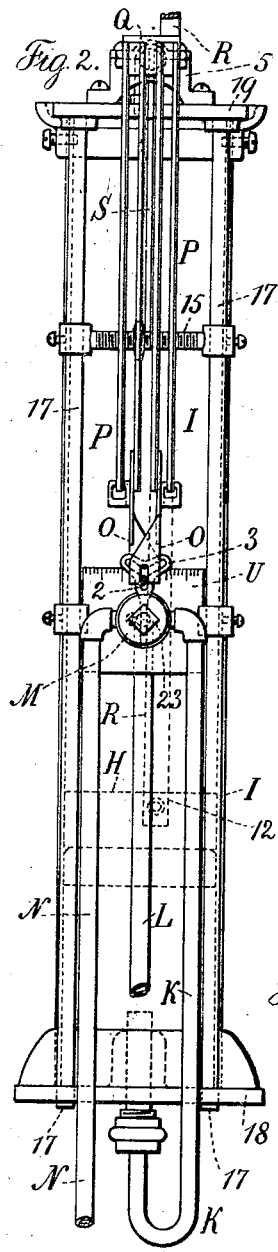
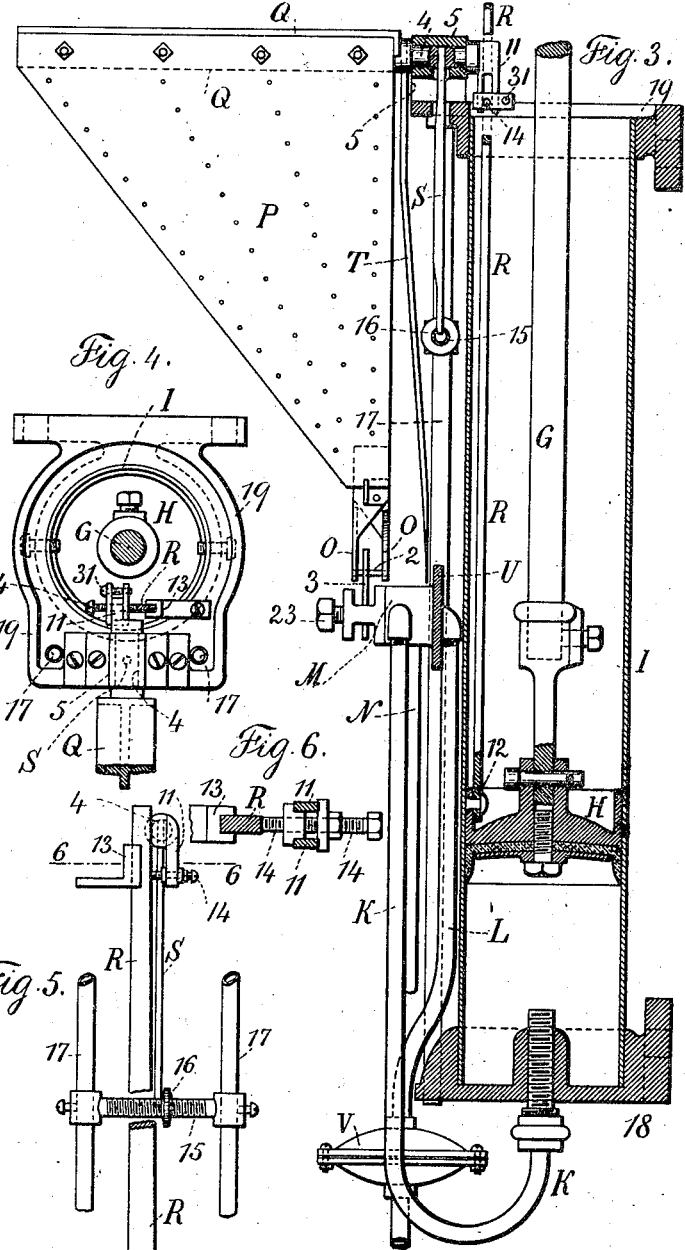
Witnesses:
J. Staib
Chas. A. Smith
Inventor:
Frederic C. Chadborn
per Lemuel W. Serrell
Atty (No Model.) 3 Sheets—Sheet 3.
F. C. CHADBORN.
VENTILATOR FOR GREENHOUSES OR OTHER STRUCTURES.
No. 551,889. Patented Dec. 24, 1895.
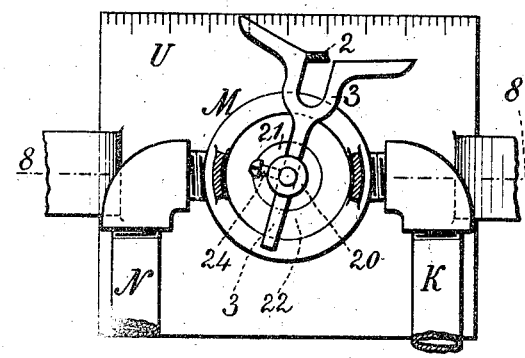
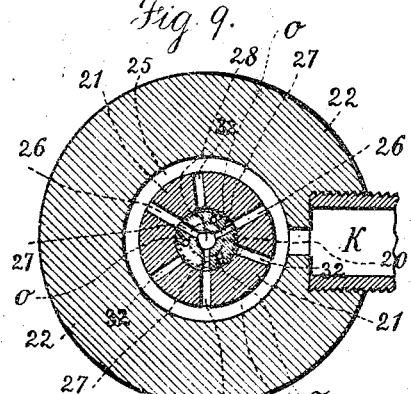
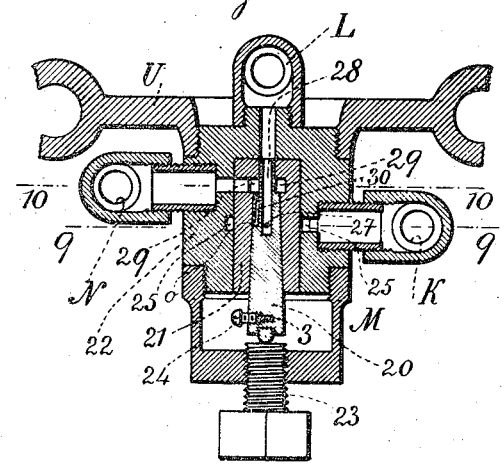
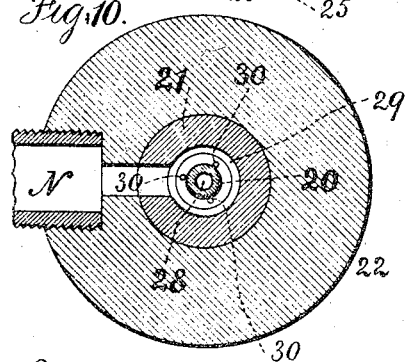
Witnesses:
J. Staib
Chas N. Smith
Inventor:
Frederic C. Chadborn
per Lemuel W. Serrell
Atty

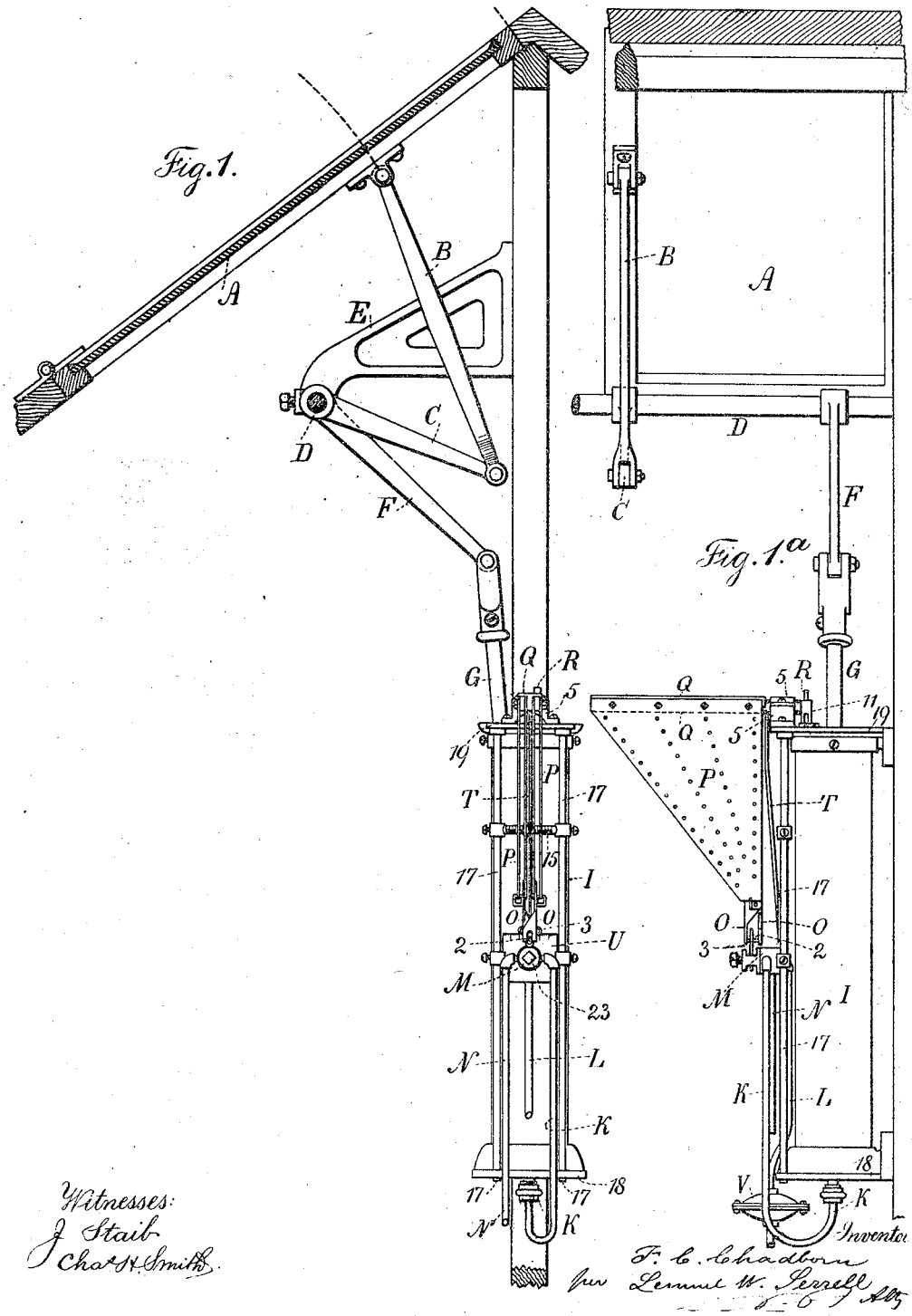

UNITED STATES PATENT OFFICE.

FREDERIC C. CHADBORN, OF NEWBURG, ASSIGNOR TO THE CHADBORN-KENNEDY MANUFACTURING COMPANY, OF FISHKILL-ON-THE-HUDSON, NEW YORK.

VENTILATOR FOR GREENHOUSES OR OTHER STRUCTURES.

SPECIFICATION forming part of Letters Patent No. 551,889, dated December 24, 1895.

Application filed September 19, 1894. Serial No. 523,440. (No model.)

*To all whom it may concern:*

Be it known that I, FREDERIC C. CHADBORN, a citizen of the United States, residing at Newburg, in the county of Orange and State of New York, have invented an Improvement in Ventilators for Greenhouses or other Structures, of which the following is a specification.

The object of the present invention is to move a ventilator by change of temperature and to hold the ventilator in the position to which it may have been moved until there is another change of temperature sufficient to again actuate the apparatus for either opening the ventilator farther or for partially closing such ventilator.

This invention is to overcome the difficulty which has heretofore arisen in automotic ventilating apparatus in which a rise of temperature continues to open the ventilators until the inflow of external atmosphere lowers the temperature sufficiently to act upon the apparatus in the opposite direction, and hence there is a nearly constant movement first one way and then the other way of the automatic apparatus, or else the ventilator is moved too far before the movement is arrested.

In my present improvements a piston and connection therefrom to a ventilator are made use of and the pressure of water or other fluid is employed as a motor, and there is a thermostatic device acting upon a cock to regulate the admission of water-pressure to act upon the piston in opening the ventilator, or such cock allows the escape of water from the cylinder to allow the piston to descend and close the ventilator more or less, and in connection with the movement of the piston I employ a device, such as a tapering bar, that gives motion to the thermostat, so that when the temperature has caused this thermostat to act in one direction to open the cock or valve the movement of the piston resulting from either the inlet or the outlet of fluid from the cylinder causes the thermostat to swing in the opposite direction and thereby stop the movement of the ventilator as it is either opened or closed by turning off the valve or cock, so as to hold the parts in the position to which they may have been moved until there is another change in the temperature of the greenhouse or other structure to act through the thermostat and open the valve if the temperature increases to admit more water into the actuating-cylinder or to open the escape of the water from such cylinder if the temperature decreases, thereby allowing the ventilator to close automatically.

By this improvement the ventilator remains quiescent, except after the temperature has either risen or fallen to a small extent—say 1° to 5°—after which the automatic ventilating apparatus will be actuated by the thermostat and the devices controlled by it to move the ventilator one way or the other to a small extent and there hold such ventilator.

In the drawings, Figure 1 is a general elevation indicating the manner in which the actuating-cylinder and piston can be applied to a ventilator; and Fig. 1$^a$ is a general elevation of the parts shown in Fig. 1, but at right angles thereto. Fig. 2 is an elevation of the thermostatic apparatus in larger size. Fig. 3 is a side view, partially in section, of such thermostatic apparatus. Fig. 4 is a plan view of the cylinder and part of the support for the thermostat. Fig. 5 is a diagrammatic elevation of the wedge-rod and the adjusting apparatus for the base of the thermostat. Fig. 6 is a sectional view in larger size at the line 6 6, Fig. 5. Fig. 7 is a magnified sectional elevation of the cock endwise of the plug. Fig. 8 is a sectional plan view of the cock at the line 8 8 of Fig. 7. Fig. 9 is a sectional plan view, in still larger size, of the cock at the line 9 9 of Fig. 8. Fig. 10 is a sectional plan view at the line 10 10 of Fig. 8.

The ventilator is of any desired character. I have represented a sash at A in the inclined roof, such as the roof of a greenhouse, and to this sash a rod B is connected to a crank-arm C on the actuating-shaft D, that is suitably supported by a bracket E or otherwise, and in a greenhouse this shaft D will run longitudinally and in the upper part or peak of the greenhouse, so that there may be as many arms C and rods B as there are ventilating sashes or flaps in the top of the greenhouse, and the shaft D is turned to open or close the ventilators by an arm F to a rod G, connected at its lower end to a piston H in a cylinder I, and when water or other fluid under pressure is admitted beneath the piston H the ventilators will be opened in proportion to the height that the piston H is raised, and when the fluid is allowed to pass out from the cylinder I the piston H will descend and the ventilators be closed to a greater or less extent. The fluid under pressure is supplied through a cock or valve, as hereinafter described, and flows through the pipe K either into or out of the cylinder I, and I have represented a supply-pipe L to the cock at M, and from this cock a discharge-pipe N leads the water to any convenient cesspool or sewer.

The thermostat P is of any desired character. Advantageously it is made of plates of hard rubber and of metal riveted together and fastened to the stock or head-piece Q, and at the lower or moving end of the thermostat there are one or more fingers O to act upon the cock M, and I find it advantageous to connect the plates of the thermostats in pairs and to unite the fingers O by the cross-bar 2, which acts directly upon the notched lever 3 of the regulating-cock to open or close the same.

The stock or head-piece Q of the thermostat is on a shaft or stud 4 in a stationary bearing 5, preferably at the upper end of the cylinder I, and at the back end of such shaft or stud 4 is a crank-arm 11 that is acted upon by the taper or wedge rod R that is attached at its lower end 12 to the piston H, and such taper-rod R slides at one side against a fixed bearing 13 and at the other side against the adjusting-screw 14 upon the crank-arm 11, so that as the piston H may rise and the taper-rod R act between the fixed bearing 13 and the screw 14 the crank-arm 11 will turn the shaft 4 and swing the thermostat bodily in a direction to move the cock back to a normal position. Hence it will be apparent that if the temperature increases and the cock is opened to cause the water-supply to raise the piston H, such piston as it rises carries with it the taper-rod R, and this, acting upon the instrumentalities before mentioned, swings the thermostat bodily so as to again close the cock and shut off the supply of water into the cylinder I, stopping the further movement, and on the other hand if the temperature decreases and the thermostat moves at its lower end the other way and turns the cock so as to let the water run out from the cylinder I and the piston H to descend, as such piston descends and carries with it the taper-rod R the thermostat will be moved in the other direction to again close the cock and cut off the further escape of water from the cylinder I and hold the ventilator in the position to which it may have been moved, the weight of the ventilator or the pressure of a spring or a fluid acting to close the ventilator.

In order to turn the shaft 4 and press the adjusting-screw 14 of the crank against the side of the taper-rod R, it is advantageous to employ a spring, and a convenient construction of spring is a blade S secured at its upper end in the shaft 4 and advantageously passing through an elongated slot in the lower part of the stationary bearing 5, and the lower end of this spring-blade is within a groove in the screw cross-bar 15, upon which a nut 16 is provided to act against the spring-blade S as it tends to turn the shaft or stud 4 and press the screw 14 against the side of the taper-rod R, and this screw cross-bar 15 is advantageously held at its ends between the rods 17 that tie the base 18 of the cylinder I to the top ring 19 so as to hold these parts in position; and I remark that this base 18 is advantageously made with a recess, as shown in Fig. 3, so that any sediment may remain in the bottom of the cylinder and undisturbed so as not to tend to clog or obstruct the operation of the cock hereinafter described.

I provide an index-arm T extending from the shaft 4 to a suitable indicator-plate U, upon which may be marked numbers indicating the degrees of a thermometer, and it will be understood that by adjusting the screw 14 the shaft 4 will be turned and the thermostat swung at its lower end and also the index-arm T will be moved. Hence the apparatus can be regulated so that the ventilators will be opened when the thermometer rises above a given indicated point, or they will be partially or entirely closed when the thermometer descends below a given point, and the indicator-plate U denotes approximately the temperature, so that the screw 14 may be adjusted as required from time to time in maintaining the proper temperature in the greenhouse or other structure.

This apparatus thus far described may be availed of with a supply cock or valve of any desired character that is adapted to being acted upon by the moving end of the thermostat. I, however, prefer and use the cock represented in Figs. 7, 8, 9 and 10, these figures being of magnified size in order to show the construction of the cock more clearly. The plug 20 of the cock is in a stationary barrel 21 within the body 22, and the plug 20 is tapering and provided at the outer larger end with a central bearing against which the screw 23 bears, and the water-pressure from the supply-pipe L acts upon the smaller end of the plug 20 and tends to force the plug toward the screw 23. Hence by adjusting this screw 23 the tapering plug can be set up to a position where it will turn with great freedom, but at the same time there will not be any leakage, and the notched lever 3 passes transversely through a mortise near the larger end of the plug 20, and it can be moved in and out and held by a set-screw 24; and it will be observed that the cross-bar 2 of the thermostat is adapted to pass into the notch of this lever 3, as indicated in Fig. 7, and when the thermostat is in a normal position of rest and the lever 3 is vertical the bar 2 is in the slot and the cock stands in the position where all the water-ways are closed. If the temperature increases, the thermostat moves the bar 2 toward the position indicated in Fig. 7. If the temperature decreases, the movement is in the opposite direction. In either instance when the cock has been fully opened for the supply or fully opened for the discharge of water from the cylinder I the thermostat may move still farther by the increase or decrease of the temperature and the cross-bar 2 will travel either in a slot, as indicated in Fig. 2, or along the upper edge of one arm of the notched lever 3, as seen in Fig. 7. In either instance the further movement of the thermostat will not change the position of the regulating-cock.

The pipe K that leads to the bottom of the cylinder I opens, as indicated in Figs. 8 and 9, into an annular recess 25 around the barrel 21, and through the barrel 21 there are radial water-ways 26 to the plug 20, and in the plug 20 there are radial water-ways 27 leading to the central water-way 28 that opens at the smaller end of the plug 20 to the supply-pipe L. Hence when the water-ways 27 of the plug are turned to coincide with the radial water-ways 26 the water passes from the supply-pipe L through the central water-way 28 and the radial water-ways 27 and 26 into the annular recess 25 and from thence by the pipe K into the cylinder I, and in consequence of these water-ways being small they are closed by a slight movement of the plug and cock or opened by an equally-slight movement in the other direction, it being understood that when the notched lever 3 is vertical the supply of water will be shut off by the water-ways 26 and 27 not coinciding, and when the notched lever is in the position shown in Fig. 7 these water-ways coincide, as indicated in Fig. 9.

The escape-pipe N opens by a lateral water-way into an annular recess 29 around the plug 20 and in the barrel 21, and there is an offset in the plug 20 and parallel holes 30 bored in the plug, as shown in Fig. 10, the ends of these holes opening into the annular recess 29, and from these parallel holes there are lateral ports o, as seen in Figs. 8 and 9, that open in line with the radial water-ways 32 when the notched lever 3 is moved in the proper direction, so as to turn the plug 20 to cause such lateral ports o to coincide with the radial water-ways 32, and when this takes place the water from the cylinder I passes by the pipe K, annular recess 25, radial water-ways 32, lateral ports o, parallel holes 30, into the annular recess 29, and from there by the discharge water-pipe N to any sewer, cesspool or other receptacle.

It is to be understood that the water or fluid pressure is to be sufficient for giving motion to the piston H and also that the ports and holes in the cock are sufficiently small to prevent a rapid movement of the piston, thereby insuring a more regular and proper adjustment of the ventilators, and it is advantageous to apply a strainer V upon the supply-pipe L, so as to carefully exclude any foreign substance that might be liable to clog the ports or passages in the regulating-cock.

I find it usually advantageous to be able to move the adjusting-screw 14 toward and from the stud 4, so as to vary the length of leverage and the consequent movement given by the taper-bar through the crank to the lower or moving end of the thermostat, and with this object in view the crank-arm 11 can be slotted, as shown in Fig. 3, and provided with a clip forming a nut for the adjusting-screw 14, and such clip can be loosened by turning the screw 31, which will allow the clip to be moved along upon the crank 11 to any desired place. If the screw 14 has a jam-nut, as seen in Fig. 6, the clamping-screw 31 may be dispensed with. This adjustment is advantageous in adapting the apparatus to different places according to the character of ventilation required.

Sometimes there is a leakage between the piston H and the cylinder I, and water accumulating above the piston may overflow the cylinder and discolor the exterior surface. To prevent this I make the top ring 19 of the cylinder cup-shaped, as seen in Fig. 3, and make one or both of the rods 17 tubular, so that the water which may accumulate in the cylinder I and be raised by the upward movement of the piston may overflow into the cup-shaped top ring 19 and run down through the tubular rod 17 and be led away by a connection to the discharge-pipe N, or in any other suitable manner.

Any suitable means may be employed in place of the spring S for causing the screw 14 to follow the taper or incline that restores the thermostat to a normal position.

I do not limit myself to any particular form of thermostat or of mechanism actuated thereby in one direction for moving the ventilator or of mechanism moving with the ventilator and stopping the action of the thermostat, as many different forms of apparatus may be employed.

I claim as my invention—

1. The combination with a cylinder, a piston, an apparatus adapted to being opened and shut, and a connection thereto from the piston, of a regulating cock, a supply for the fluid under pressure and a discharge, a thermostat and a connection from one end of the thermostat to the regulating cock for moving the same, a support for the other end of the thermostat and mechanism actuated by the piston for moving the thermostat to turn the regulating cock back to its normally closed position, substantially as specified.

2. The combination with a cylinder, a piston, an apparatus adapted to being opened and shut, and a connection thereto from the piston; of a regulating cock, a supply for the fluid under pressure and a discharge, a thermostat and a connection at one end thereof by which the thermostat gives motion to the regulating cock, a shaft for supporting the other end of the thermostat, a crank upon the shaft, and a taper bar connected with and receiving its motion from the piston and acting through the crank and thermostat to turn the regulating cock back to its normally closed position, substantially as set forth.

3. The combination with a cylinder and a piston, an apparatus adapted to being opened and shut and a connection thereto from the piston, of a regulating cock, a supply for the fluid under pressure and a discharge, a thermostat and a connection at one end thereof by which the thermostat gives motion to the regulating cock, a shaft for supporting the other end of the thermostat, a crank upon the shaft, a taper bar connected with and receiving its motion from the piston and acting through the crank and thermostat to turn the regulating cock back to its normally closed position, and a device for moving the shaft and keeping the crank toward the taper rod, substantially as set forth.

4. In a thermostatic ventilating apparatus the combination with a thermostat and a bar 2 connected therewith, of a regulating cock for the supply of liquid, a notched lever engaging the plug of the cock and receiving the bar 2 by which bar it is operated and the cock fully moved in either direction, after which movement the bar passes out of the notch of the lever with the further movement of the thermostat as the temperature rises or falls, substantially as specified.

5. The combination in a thermostatic ventilating apparatus with a thermal motor and a fluid pressure motor, of a regulating cock operated by the thermal motor and having a central supply for the fluid under pressure, radial water ways and an annular water way and a connection therefrom to the fluid pressure motor or actuating device in the ventilating apparatus, and lateral ports and a second annular recess opening therefrom and a pipe connected thereto for the discharge of the fluid, substantially as set forth.

6. The combination in a thermostatic ventilating apparatus with a thermal motor and a fluid pressure motor for actuating the ventilating apparatus, of a regulating cock having a central supply for the fluid under pressure, radial water-ways and an annular water-way opening to the cylinder or actuating device in the ventilating apparatus, and lateral ports opening to a second annular recess for the discharge of the fluid, substantially as set forth.

Signed by me this 3d day of August, 1894.

FREDERIC C. CHADBORN.

Witnesses:
GEO. T. PINCKNEY,
A. M. OLIVER.